United States Patent [19]
Rogers

[11] Patent Number: 6,056,016
[45] Date of Patent: May 2, 2000

[54] METHOD FOR INTRODUCING A SEALANT INTO A CLEARANCE FORMED BETWEEN A REPLACEMENT PIPE AND AN EXISTING PIPE WITHIN WHICH THE REPLACEMENT PIPE IS LOCATED

[75] Inventor: Alan Foster Rogers, Southport, United Kingdom

[73] Assignee: British Gas plc, London, United Kingdom

[21] Appl. No.: 08/725,694

[22] Filed: Oct. 3, 1996

Related U.S. Application Data

[60] Continuation of application No. 08/372,365, Jan. 13, 1995, abandoned, which is a division of application No. 08/202,453, Feb. 28, 1994, Pat. No. 5,497,807.

[30] Foreign Application Priority Data

Mar. 10, 1993 [GB] United Kingdom .................. 9304877

[51] Int. Cl.[7] ........................................................ F16L 55/18
[52] U.S. Cl. ............................ 138/98; 138/97; 264/269; 405/154
[58] Field of Search ............................ 138/103, 108, 138/97, 98; 405/150, 154; 264/269; 156/289; 137/67, 68.1

[56] References Cited

U.S. PATENT DOCUMENTS

| | | | |
|---|---|---|---|
| 3,762,446 | 10/1973 | Tungseth et al. | 138/97 |
| 3,772,113 | 11/1973 | Patrick | 138/97 |
| 3,834,422 | 9/1974 | Larson . | |
| 4,646,787 | 3/1987 | Rush et al. | 138/98 |
| 4,728,223 | 3/1988 | Rice | 138/97 |
| 5,345,971 | 9/1994 | Elgar et al. | 138/98 |
| 5,372,162 | 12/1994 | Frey | 138/98 |
| 5,379,803 | 1/1995 | Elgar et al. | 138/97 |
| 5,433,251 | 7/1995 | Elgar et al. | 138/98 |

FOREIGN PATENT DOCUMENTS

| | | |
|---|---|---|
| 2 123 919 | 2/1984 | United Kingdom . |
| 2 227 071 | 7/1990 | United Kingdom . |
| WO 90/07672 | 7/1990 | WIPO . |

*Primary Examiner*—Patirck Brinson
*Attorney, Agent, or Firm*—Oblon, Spivak, McClelland, Maier & Neustadt, P.C.

[57] ABSTRACT

Apparatus is provided for introducing sealant into a clearance between a replacement pipe and an existing pipe within which in use the replacement pipe is located. The apparatus includes a nose-cone having a tubular body for connection to the upstream end of the replacement pipe, a frangible member in the form of a pop-out plug; pierceable metal foil; plastic film or membrane to seal the bore of the tubular body and at least one non return valve in the form of an elastic ring, rubber O-ring or plug and spring assembly to permit the flow of sealant from the bore of the body into the clearance by way of the wall of the body but to resist return-flow from the clearance into the bore.

11 Claims, 5 Drawing Sheets

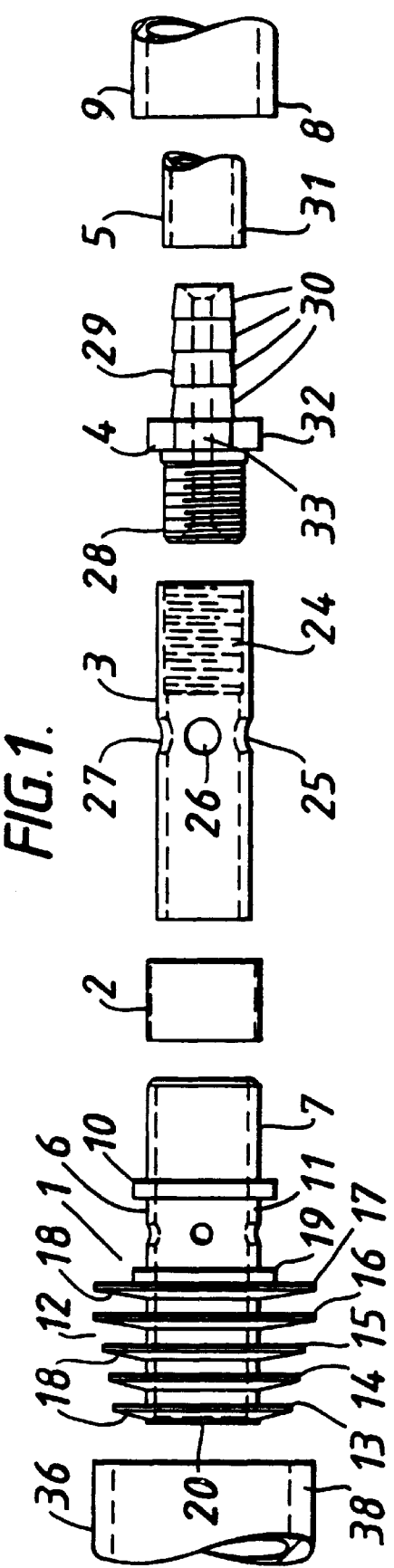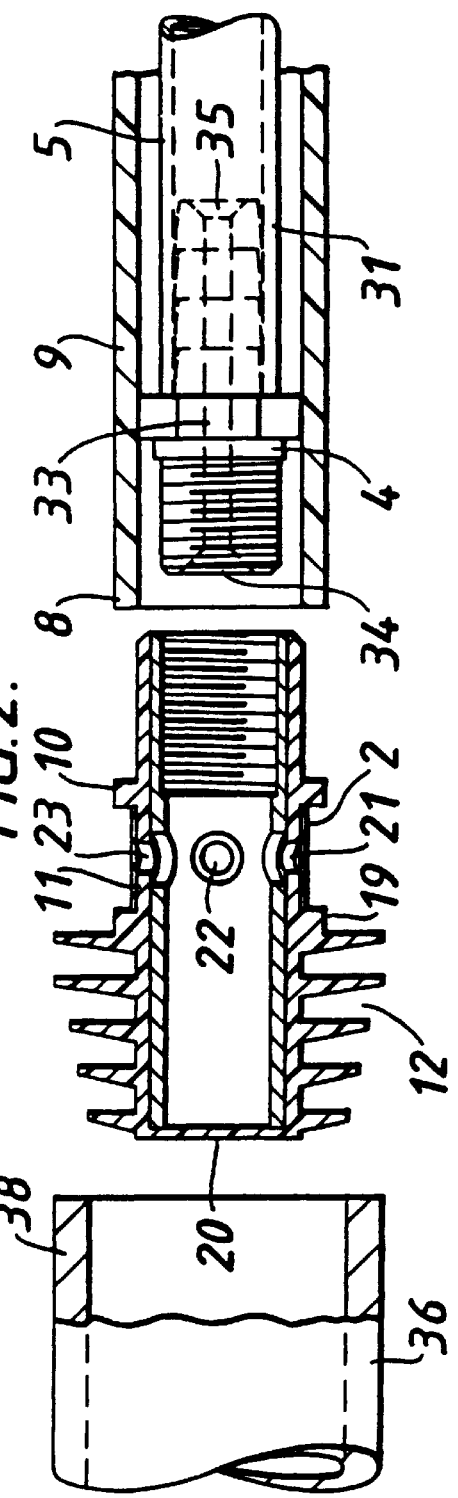

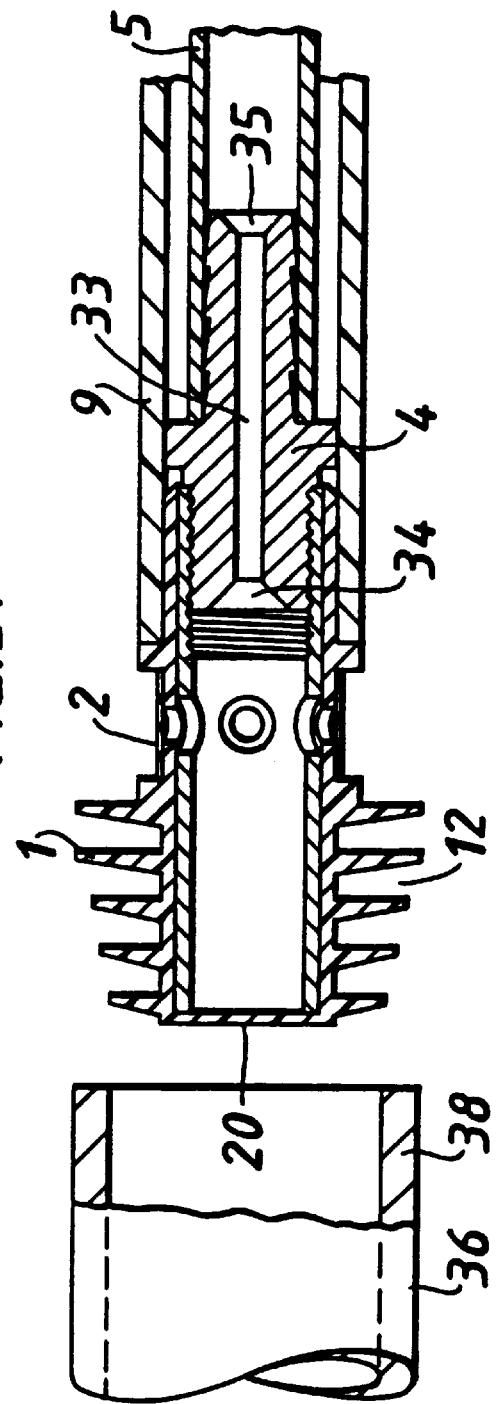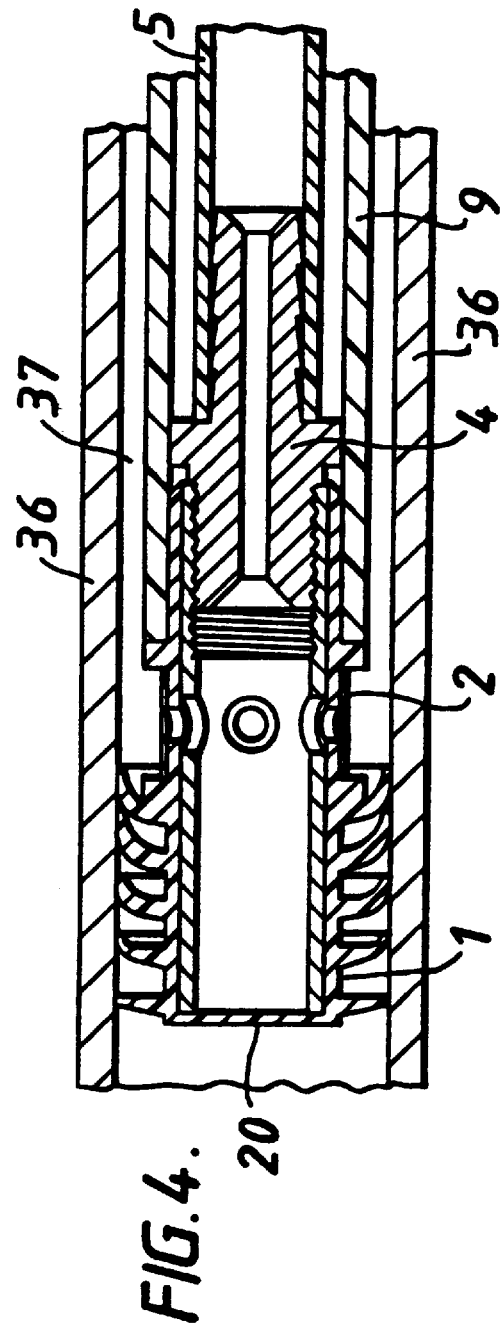

METHOD FOR INTRODUCING A SEALANT INTO A CLEARANCE FORMED BETWEEN A REPLACEMENT PIPE AND AN EXISTING PIPE WITHIN WHICH THE REPLACEMENT PIPE IS LOCATED

This application is a Continuation of application Ser. No. 08/372,365, filed on Jan. 13, 1995, now abandoned; which is a divisional application filed off of application Ser. No. 08/202,453, filed on Feb. 28, 1994, now U.S. Pat. No. 5,497,807.

BACKGROUND OF THE INVENTION

1. Field of the Invention

The present invention relates to an apparatus and method for introducing sealant into a clearance between a replacement pipe and an existing pipe within which, in use, the replacement pipe is located.

2. Discussion of the Background

UK Published Patent Application Nos. 2227071A and 2236158A both describe methods for replacing or relining pipes, particularly domestic gas service pipes, with replacement pipes.

In the methods described, after the replacement pipe has been inserted into the existing pipe, any clearance between the pipes is sealed with a sealant of a flowable, settable kind such as grout or an anaerobic sealant or any other suitable kind of sealant.

The sealant is injected into the downstream end of the clearance via a suitable fitting, it being understood that the terms "downstream" and "upstream" are used in relation to the normal direction of flow of gas in the existing service pipe from the main towards and into the premises. The injected sealant travels upstream along the clearance until it reaches the so-called "nose-cone". This is a component which is connected to the leading end of the replacement pipe before it is inserted into the existing service pipe. The nose-cone has a tubular body with a downstream portion connected to the upstream/leading end of the replacement pipe. Around the upstream portion of the body usually are means for sealing the clearance between the pipes when the replacement pipe is located within the existing pipe. The sealing means in the nose-cone are in the form of a flange or flanges or a vane or vanes and form a tight interference fit with the internal wall of the existing pipe. It is these flanges or vanes which stop gas from entering the clearance and also prevent the further progress of the sealant during its journey along the clearance. The nose-cone also has a frangible means to seal the bore of the tubular nose-cone body. This serves temporarily to prevent the ingress of gas into the replacement pipe.

When the sealant reaches the nose-cone, it is a signal that the entire clearance is occupied by sealant and that the clearance is completely sealed, the seal provided by the flange(s) or vane(s) not being considered totally secure.

The distance between the downstream injection point in the clearance and the nose-cone may be several meters as the distance will be equivalent to the length of service pipe being replaced. Clearly to fill the entire clearance a very large quantity of sealant is necessary and this increases the costs of these particular replacement methods.

SUMMARY OF THE INVENTION

It is therefore an object of the present invention to provide an apparatus and method for introducing sealant into the clearance between a replacement pipe and an existing pipe in such a way that the quantity of sealant is reduced in comparison to the techniques described while a safe seal is still formed.

According to one aspect of the present invention, we provide an apparatus for introducing sealant into a clearance between a replacement pipe and an existing pipe within which in use the replacement pipe is located, the apparatus comprising a nose-cone having a tubular body for connection to the upstream end of the replacement pipe, frangible means to seal the bore of the tubular body and at least one non return assembly means to permit the flow of sealant from the bore of the body into the clearance by way of the wall of the body but to resist return flow from the clearance into the bore.

Preferably the tubular body has a downstream portion for connection to the upstream end of the replacement pipe and an upstream portion provided with means for sealing the clearance between the pipes when the replacement pipe is located within the existing pipe.

Suitably the wall of the body has at least one aperture and the assembly means comprises a valve. The valve may comprise resilient means adapted in one position to close the or each aperture and in another position to open the or each aperture if acted upon by sealant supplied above a predetermined pressure.

In one embodiment of the invention the resilient means comprises a ring of elastic material which is slipped over the body of the nose-cone to cover the aperture or all the apertures in the body of the nose-cone unless acted upon by the sealant.

In another embodiment of the invention the resilient means comprises a plug and spring against which in use the plug moves, the plug and spring being located within the body of the nose-cone with the spring located between the frangible means and the plug, the arrangement being such that in a first position the plug closes the or each aperture in the nose-cone body and on being moved to a second position against the spring if acted upon by sealant supplied above a predetermined pressure, the plug opens the or each aperture before returning to the first position under the action of the spring with release of the sealant pressure.

The apparatus may further comprise means for supplying sealant to the nose-cone. In this case the sealant supply means may be a tube having an upstream end for releasable connection to the downstream portion of the nose-cone and dimensioned to be inserted into and be retracted from the replacement pipe.

Preferably means are provided for releasably connecting the tube to the nose-cone, the means comprising a tubular liner for the nose-cone, the liner being adapted to be a close push-fit within the nose-cone and having at least one aperture in its wall, the aperture or each aperture in the liner corresponding with that or those as the case may be in the nose-cone when the liner is appropriately positioned within the nose-cone, the liner being internally threaded and the connecting means also comprising a nozzle for connection to the leading end of the tube, the nozzle being externally threaded for connection to the liner whose threads correspond.

The means for sealing the clearance between the pipes in the nose-cone may comprise at least one vane or flange disposed around the wall of the nose-cone.

Preferably there are a plurality of vanes or flanges, the diameter of the vanes or flanges increasing in the direction of the downstream portion of the body from the upstream portion.

Suitably the frangible means is a member in the form of a metal foil, plastics film or membrane which can be broken by a rod or the like introduced down the replacement pipe.

Alternatively and most preferably the frangible means is a member in the form of a plug in the bore of the nose-cone body, which plug can be pushed out by a rod or the like introduced down the replacement pipe.

Conveniently the frangible means or member is located at the front end of the nose-cone.

The nose-cone may be made of polyethylene and may be a molding.

The nose-cone may be formed from the replacement pipe itself rather than comprising a separate element thereof.

According to a second aspect of the present invention there is provided a method for introducing sealant into a clearance between a replacement pipe and an existing pipe within which the replacement pipe is located, the method comprising introducing the sealant into the clearance at an upstream point in the clearance and causing the sealant to flow to a downstream point in the clearance.

Preferably the sealant is injected at the downstream end of the replacement pipe.

Suitably before the sealant is introduced into the clearance, the clearance is sealed at a point further upstream than the point at which the sealant is introduced.

Conveniently, during the introduction of the sealant, the upstream bore of the replacement pipe is temporarily sealed.

In one embodiment of the invention the sealant is pumped along a tube to the point of introduction into the clearance, the tube being located within the replacement pipe.

BRIEF DESCRIPTION OF THE DRAWINGS

Embodiments of the invention will now be particularly described with reference to the drawings in which:

FIG. 1 is an exploded side view of the components in one version of the apparatus, FIG. 2 is a longitudinal section side view of the nose-cone assembly and a side view of the tube assembly before connection to the nose-cone, FIG. 3 is a longitudinal section side view showing the nosecone and tube assembly connected together and in position in the replacement pipe before its insertion into the existing pipe, FIG. 4 is a view similar to that shown in FIG. 3, the replacement pipe having now been fully inserted into the existing pipe.

DESCRIPTION OF THE PREFERRED EMBODIMENTS

Figure 5:
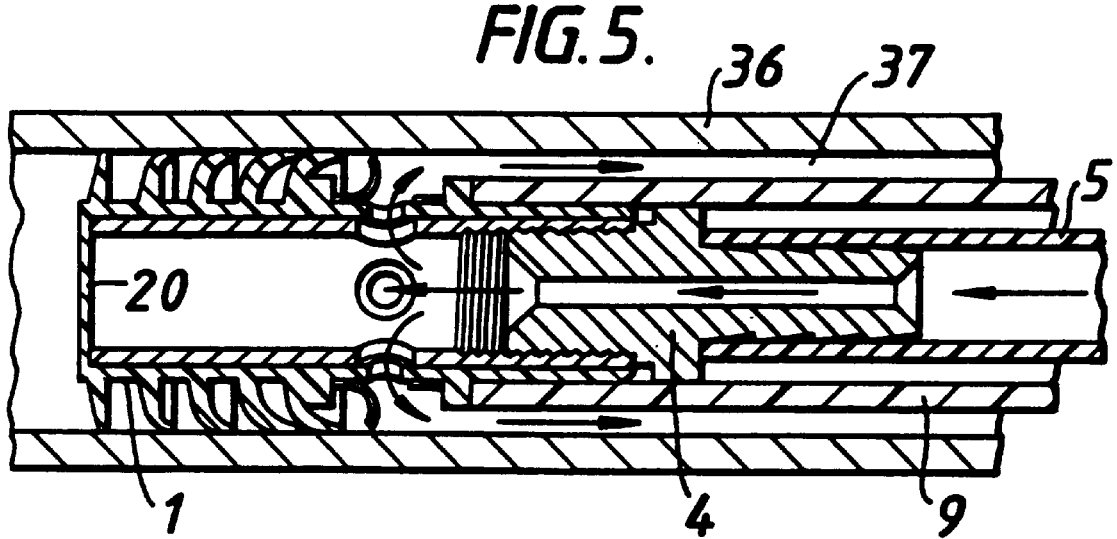
FIG. 5 is a view similar to that in FIG. 4, the arrows showing the direction of movement of sealant along the tube assembly, nose-cone and into and along the clearance between the pipes.

Referring to FIGS. 1 to 9, the apparatus shown in FIG. 1 comprises a nose-cone 1, a ring 2 of an elastic material to form the return valve means in the nose-cone 1, a tubular liner 3 for close push fitting within the nose-cone 1 and a nozzle 4 for fitting into the leading end of a tube 5 through which, in use, sealant is to be pumped to the nose-cone 1.

The nose-cone 1 is similar to those described in our published UK patent application No. 2227071A and is a molding of a suitable plastics material such as polyethylene. The nosecone 1 comprises a tubular body 6 having a rear or downstream portion 7 for connection to the leading or upstream end 8 of a replacement pipe 9 which may itself be of a plastics material such as polyethylene. In this case the nose-cone 1 is connected to the replacement pipe 9 by push-fitting the rear portion 7 of the body 6 into the leading end 8 of the replacement pipe 9, there being a locating flange 10 around the wall 11 of the body 6 to act as a stop. However such a flange is not essential and may be omitted to reduce the costs of production of the nose-cone 1. In addition, the nose-cone 1 may be attached to the replacement pipe 9 in other suitable ways for example by an adhesive method or by fusing the members together.

The connection between the nose-cone 1 and the replacement pipe 9 must be secure enough to withstand disconnection by the pressure of sealant.

The nose-cone 1 also comprises an upstream or front portion 12 formed with a plurality, in this case five, generally circumferentially disposed and radially directed annular vanes 13 to 17 which are spaced from each other and the diameter of which increases in a direction from the front to the rear of the nose-cone 1. The vanes have front or upstream surfaces 18 which taper towards their periphery so that they can flex more easily in use as shown particularly in FIGS. 4 to 9. The most-rearward or downstream vane 17 is bolstered by a flange 19 to support it in use.

Closing the bore of the nose-cone 1 at its front or upstream end is a frangible means 20 which is in the form of a pop-out plug but could be in the form of a metal foil or a plastic film or membrane. The plug, foil, film or membrane are each strong enough to resist the pressure of flowing sealant but can be displaced or burst as the case may be with a rod. The plug, foil, film or membrane prevent the ingress of gas into the nose-cone body and thence into the replacement pipe until the plug is removed or the foil or sheet broken.

Extending radially through the wall 11 of the body 6 in that portion of the wall 11 lying between the flanges 10 and 19 are a plurality, in this case four, apertures (only three visible in the drawings) 21 to 23 which are circumferentially spaced by 90° from each other. These permit sealant entering the body 6 of the nose-cone 1 via the downstream end to enter the clearance between the pipes as will be described in more detail subsequently.

The ring 2 of elastic material e.g. a very thin elastic band shown in FIG. 1 is slipped over the body 6 of the nose-cone 1 to rest between the flanges 10 and 19 as shown in FIG. 2 and cover all the apertures 21 to 23 in the nose-cone body 6. The external diameter of the body 6 in relation to the diameter of the ring 2 is such that the ring 2 is stretched tight across the apertures 21 to 23 to ensure they are closed.

The ring 2 forms a type of non-return valve which with appropriate design will permit the egress of pumped sealant from the nose-cone body 6 into the clearance between the pipes but will prevent the return of the sealant from the clearance into the nose-cone body 6.

Referring to FIG. 1, the liner 3 comprises a tubular element which may be of a metal such as copper. The rear or downstream portion 24 of the liner 3 is internally threaded for connection to the nozzle 4 of the sealant supply tube 5 as will be subsequently described.

Situated upstream of the threaded portion 24 are four apertures 25 to 27 (only three shown) in the wall of the liner 3. These are circumferentially spaced around the liner 3 at 90° angles and correspond to the apertures 21 to 23 in the nose-cone 1 although the apertures in the liner 3 are larger than those in the nose-cone 1. The liner 3 is so dimensioned as to be a tightly fitting push-fit into the bore of the nose-cone 1 and the liner apertures are so positioned that they can be aligned with those in the nose-cone body as shown in FIG. 2.

The nozzle 4 shown in the drawings is of metal e.g. brass, and comprises an upstream or front cylindrical portion 28 which is externally threaded for threaded connection to the internally threaded bore of the liner 2 as shown in FIGS. 3 to 9.

The nozzle 4 has a rear or downstream portion 29 of smaller diameter than the front portion 28, which rear portion 29 is provided with several circumferentially arranged and sequentially disposed tooth-like elements 30 to grip the internal wall of the tube 5 when, in use, as shown in FIG. 2 onwards, the portion 29 is push-fitted within the upstream or leading end 31 of the tube 5. Separating the front and rear portions of the nozzle 4 is a flange 32 which serves to guide the nozzle 4 when it is inserted into the replacement pipe 9 as exemplified in FIG. 2, the flange 32 being a close but not tight fit in the pipe 9. The nozzle 4 has a bore 5 extending through it, which bore 5 has a cylindrical central portion 33 and outwardly tapering end portions 34 and 35 which portions are clearly shown in FIGS. 3 to 5, 7 and 8.

The tube 5 itself may be of some suitable flexible hose material such as nylon and will have a smaller external diameter than the internal diameter of the replacement pipe 9 to permit it (the tube) to be pushed freely through the replacement pipe 9 and out of the other end thereof.

The existing pipe to be replaced may be a service pipe carrying gas or water into a dwelling from a main. The pipe may be of galvanized steel for example and may need to be replaced because it is leaking due to corrosion.

In the first stage of a method for replacing a service pipe the tube 5 is inserted into the rear end of the replacement pipe 9 and out of the other front end 8 of the replacement pipe 9. The replacement pipe 9 will have already been cut to the appropriate length for replacement of existing pipe 36.

Next the rear portion 29 of the nozzle 4 is push fitted into the now visible upstream end of the tube 31 and the tube 5 and nozzle 4 are retracted a short distance into the replacement pipe 9 to the position shown in FIG. 2.

In a further stage of the method the liner 3 is push fitted into the nose-cone 1 and the elastic ring 11 positioned over the apertures 21 to 23. This position is also shown in FIG. 2.

In the next stage shown in FIG. 3, the nose-cone liner 3 is screwed onto the threaded end 28 of the nozzle 4 at the same time causing the nose cone 1 to be push-fitted into the front end 8 of the replacement pipe 9.

Next the replacement pipe 9 is inserted nose-cone first into the existing pipe 36 and pushed along it the desired length as shown in FIG. 4, the vanes 12 flexing and sealing the now formed clearance 37 between the pipes 9 and 36. While not shown, in practice the downstream end 38 of the existing pipe 36 shown in the drawings would have already been disconnected from the gas meter and would have been fitted with a gland through which the nose-cone and replacement pipe would be inserted so that the gland formed with the replacement pipe 9 forms a seal preventing the escape of gas from the downstream end of the pipe 9. The replacement pipe 9 may be sufficiently long so as to reach the connection of the existing pipe with the main several meters from the point of insertion.

There should be a sufficient length of tube 5 so that some protrudes from the back, downstream end (not shown) of the replacement pipe 9. This back end is connected to a conventional sealant injection gun (not shown). The components of the sealant which for preference is a two part anaerobic type sealant are mixed together and poured into the gun. As shown in FIG. 5, the sealant is then forced by the gun along the tube 5 into and through the nozzle 4 and then into the bore of the nose-cone 1 where it impacts on and its further forward movement is arrested by the frangible member 20.

If the sealant pressure is carefully selected, the sealant will now lift the ring 2 as shown in FIG. 5 without breaking or displacing the frangible member 20 and sealant will flow through the apertures 21–23 into clearance 37 between the pipes 9 and 36. Injection is continued until a sufficient quantity has been injected into the clearance 37. When the sealant pressure is removed the ring 2 returns to its original position to stop the sealant 39 flowing back into the nose-cone 1 as shown in FIG. 6, the ring 2 serving as a non-return valve.

Figure 6:
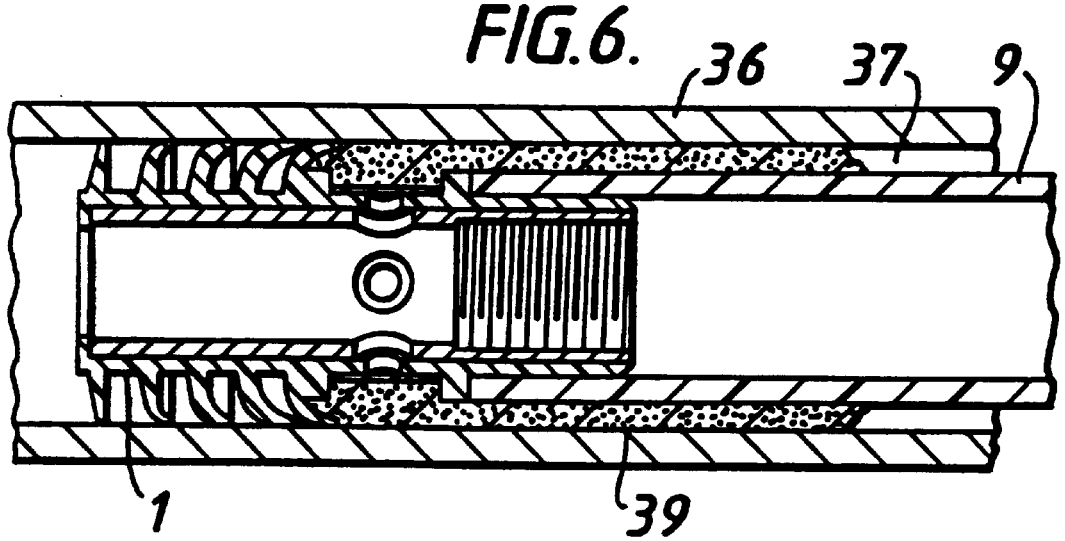
FIG. 6 shows the position after the sealant has entered the clearance and the frangible means in the nose-cone has been removed.

In the next stage as also shown in FIG. 6, the tube nozzle 4 is unscrewed from the nose-cone liner 3 by twisting the tube 5 and the tube 5 and nozzle 4 are removed.

While not shown in FIG. 6, in the final stage of the process, to connect the replacement pipe to gas, the downstream end of the replacement pipe 9 is connected to the gas meter, the valve of which is closed and a gland is fitted to the other side of the meter. A sharp pointed rod is then inserted into the gland which seals the rod to the escape of gas. The gas meter valve is then opened and the rod is pushed through the meter and along the replacement pipe until the point of the rod encounters the frangible member 20 which by continued pushing of the rod is either broken or displaced as the case may be to permit gas to enter the nose-cone 1 and thence the replacement pipe 9. Any remaining sealant in the bore of the nose-cone 1 will also be pushed out of the nose-cone. The rod is then withdrawn along the pipe 9, the meter and out of the gland and the meter valve is closed. The gland is then disconnected from the other side of the meter which is re-connected to the supply pipe.

Figure 7:
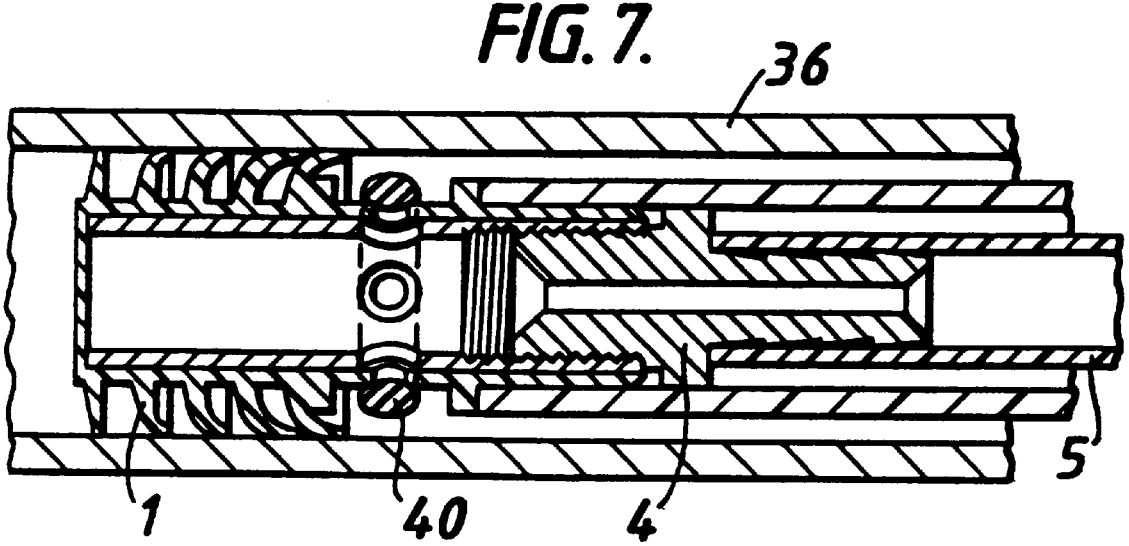
FIG. 7 is a longitudinal section side view of another version of the apparatus, the position being similar to that shown in FIG. 4.
Figure 8:
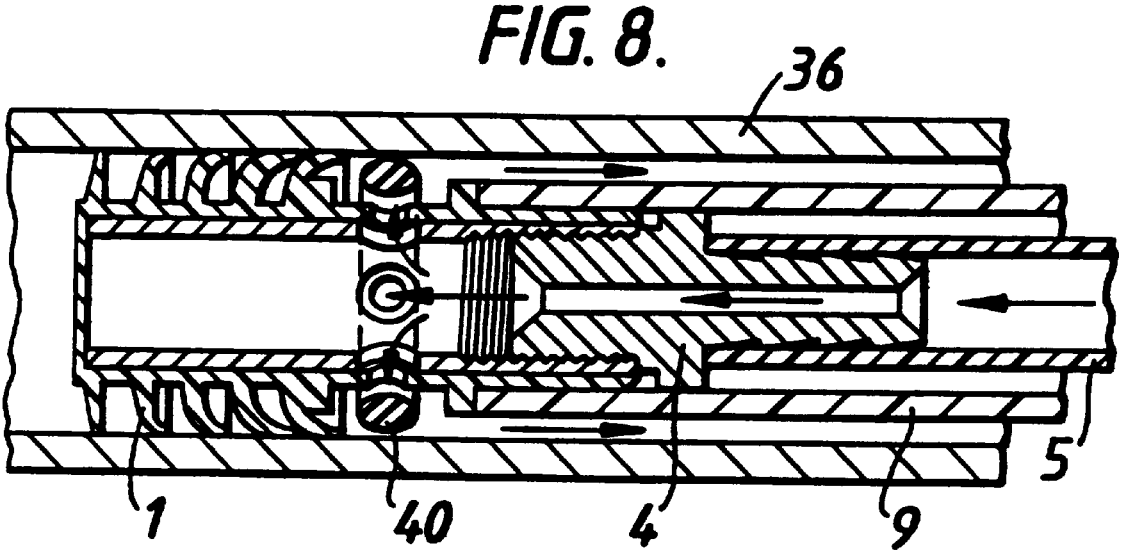
FIG. 8 is a view similar to FIG. 7, the position being similar to that shown in FIG. 5.
Figure 9:
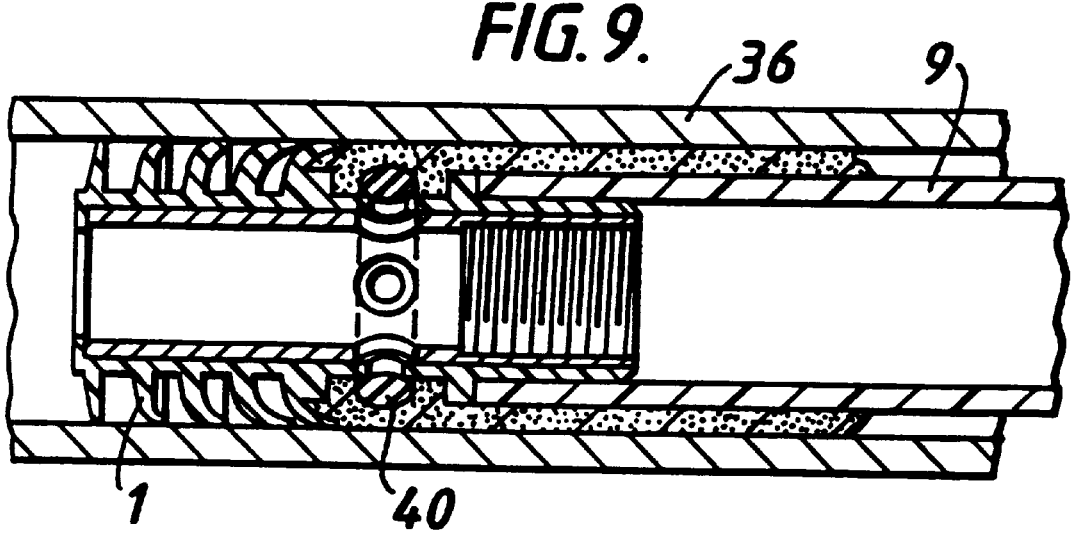
FIG. 9 is a view similar to FIGS. 7 to 8, the position being similar to that shown in FIG. 6.

Referring to FIGS. 7 to 9, the components and stages in the method are identical to those shown in FIGS. 4 to 6 and similar items bear identical reference numerals except that the elastic ring 2 has been replaced by a rubber O-ring 40 which is positioned to cover each of the apertures 21 to 23 as shown in FIG. 7 but which can be displaced by the pressure of the sealant as shown in FIG. 8 to permit the flow of sealant from the nose-cone 1 into the clearance by way of the apertures. Removal of sealant pressure causes the O-ring 40 to return to its original position to prevent the return of sealant from the clearance into the nose-cone. As with the elastic ring 2 the O-ring 40 serves as a non-return valve.

Figure 10:
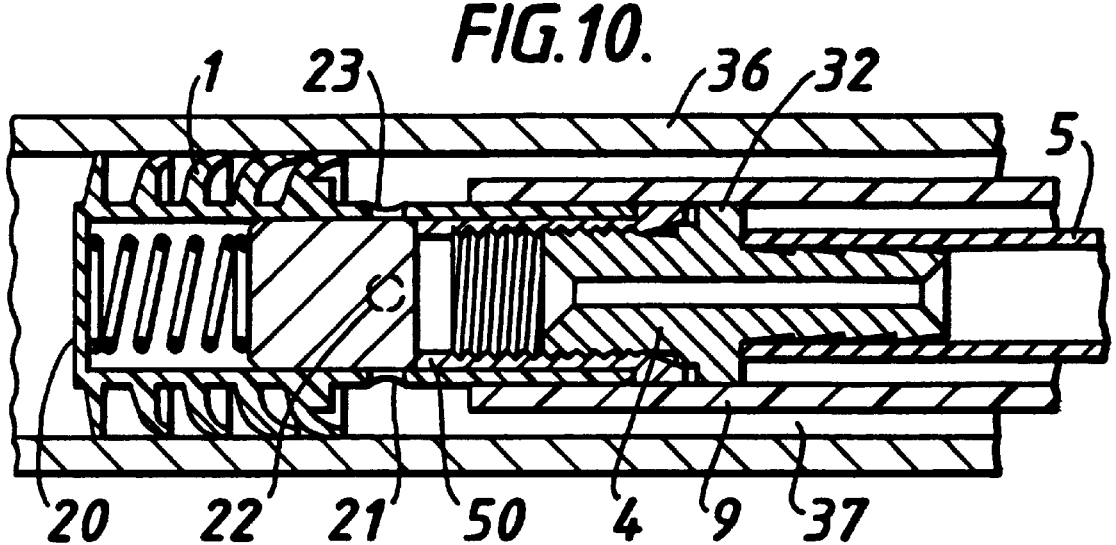
FIG. 10 is a longitudinal section side view of yet another version of the apparatus the replacement pipe having now been fully inserted into the existing pipe.
Figure 11:
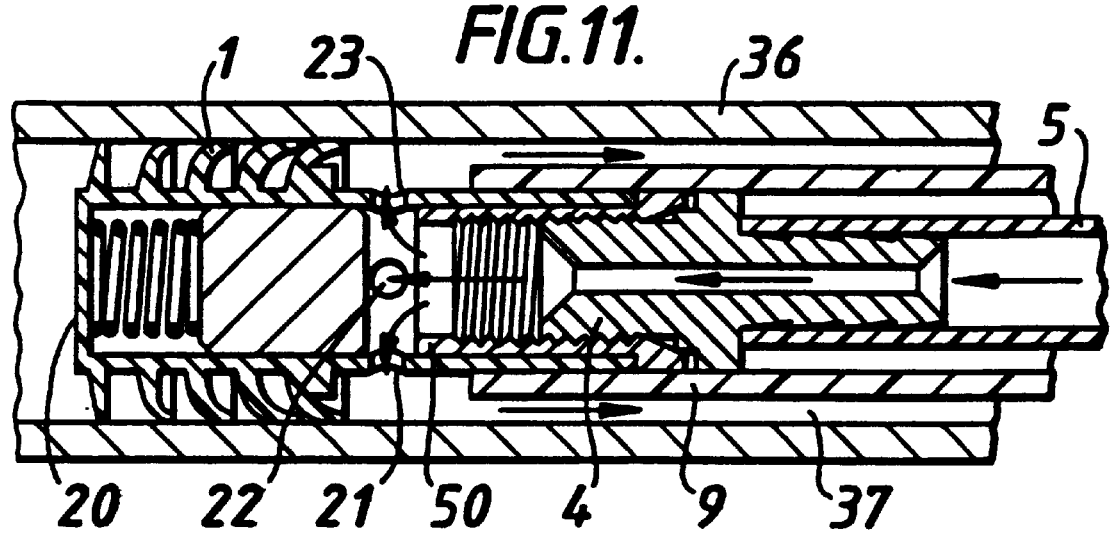
FIG. 11 is a view similar to FIG. 10, the arrows showing the direction of movement of sealant along the tube assembly, nose-cone and into and along the clearance between the pipes.
Figure 12:
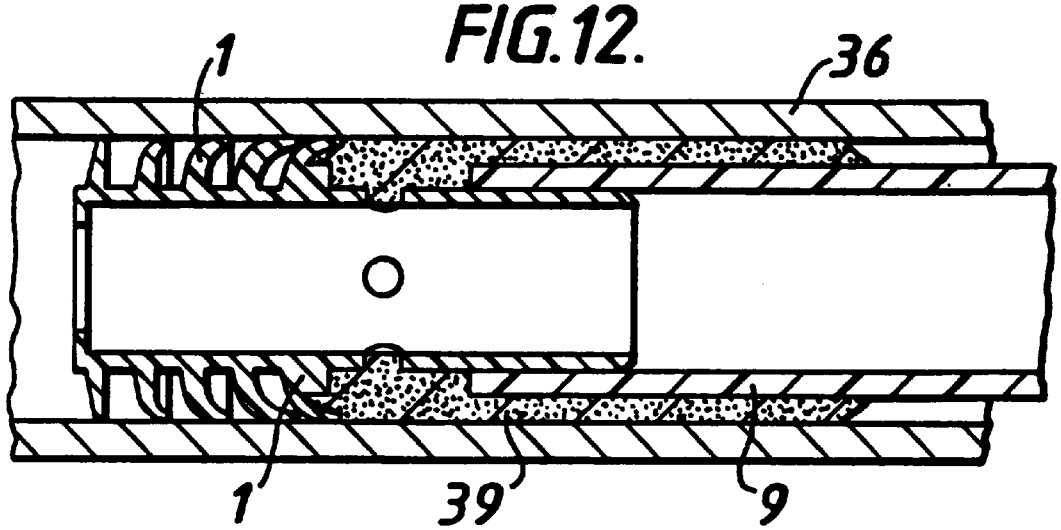
FIG. 12 shows the position after the sealant has entered the clearance and the frangible means in the nose-cone has been removed.

Referring to FIGS. 10 to 12, components similar to those in FIGS. 1 to 9 bear similar reference numerals and will not be further described except for any major differences.

The nose-cone 1 in FIGS. 10 to 12 as will be seen is not provided with the flange 10 with which the nose-cones in FIGS. 1 to 9 are provided. The liner 50 is however significantly shorter than that liner 3 shown in FIGS. 1 to 9 and is not provided with the apertures shown in the liners in FIGS. 1 to 9. The liner 50 is however provided with a flange 51 at its rear end with which, in use, as shown in the FIGS. 10 to 12 the rear end of the nose-cone 1 engages, the flange 51 itself being retained between the nose-cone 1 and the flange 32 of the nozzle 4.

In FIGS. 10 to 12 the non-return valve comprises a plug 52 and a spring 53. The plug 52 is cylindrical in shape and is of metal, e.g. steel. The spring 53 is a conventional compression spring of spring steel. In use the spring 52 is located between the frangible means 20 of the nose-cone 1 and the plug 52 which, in use, locates at its other end against the upstream end of the liner 50.

The method of assembly of the components is similar to that previously described except that before the nose-cone 1 is attached to the replacement pipe 9, the spring 53 and plug 52 in that order are inserted into the nose-cone 1. As shown in FIG. 10, the spring 53 and plug 52 are so dimensioned that initially the plug 52 closes the apertures 21 to 23 in the nose-cone 1. When sealant enters the nose-cone 1 via the tube 5 and nozzle 4 it will move the plug 52 towards and against the spring 53 if its pressure is suitably high enough so that the apertures 21 to 23 are opened as shown in FIG. 11 to enable the sealant to enter and flow along the clearance 37 between the pipes 9 and 36. When the sealant pressure is released, the plug 52 is moved towards the liner 50 by the action of the spring 53 to close the apertures 51 to 53. After the sealant has set, the tube 5, nozzle 4 and liner 50 are then removed by pulling the tube 5 out of the replacement pipe 37 to leave the nose-cone 1 and pipe 37 in situ as shown in FIG. 12. Otherwise all the other steps in the method of replacement are similar to those previously described in relation to FIGS. 1 to 9.

The method of pipe replacement described herein is very similar to those methods described in UK Published Patent Application Nos. 2227071A and 2236158A and these documents should be consulted for more comprehensive details of the replacement method though this is not essential to the understanding of the present invention which is limited to the sealant injection part of the prior methods and apparatus.

The amount of sealant used in this invention is very much reduced in comparison to the prior methods described above. In order to be sure or as sure as possible that the clearance between the pipes has been sealed it is necessary to ensure that the clearance area adjoining the nose-cone vanes is occupied by sealant. In the prior methods where the sealant is injected at the downstream end of the clearance, the sealant must be pumped along the entire clearance to reach the vanes. Thus virtually the entire clearance is occupied by sealant.

In the method of the present invention in contrast, since the sealant is actually injected through the wall of the nose-cone body, the sealant must by definition be occupying an area of clearance adjoining the nose-cone valves. Therefore it is not necessary to fill the entire clearance to ensure that the clearance has been sealed.

I claim:

1. A method for introducing sealant into a clearance formed between a replacement pipe and an existing pipe within which the replacement pipe is located, the clearance having an upstream end and a downstream end, the method comprising introducing sealant through a liner having at least one aperture formed therein through which the sealant is flowable, the sealant being introduced into the clearance at between the ends of the clearance, causing the sealant to flow through said at least one aperture to a downstream point in the clearance but not as far upstream as the upstream end of the clearance and blocking a reverse flow of the sealant from the clearance into the liner via said at least one aperture by use of a one-way valve blocking said at least one aperture.

2. A method as claimed in claim 1 in which the sealant is prevented from reaching the upstream end of the clearance by encountering a further seal sealing the clearance at a point upstream of the point where the sealant is introduced.

3. A method as claimed in claim 2, in which during the introduction of the sealant, the upstream bore of the replacement pipe is temporarily sealed.

4. A method as claimed in claim 1 in which the sealant is introduced at a point closer to the upstream end than to the downstream end.

5. A method as claimed in claim 1, in which before the sealant is introduced into the clearance, the clearance is sealed at a point further upstream than the point at which the sealant is introduced.

6. A method as claimed in claim 2, in which before the sealant is introduced into the clearance, the clearance is sealed at a point further upstream than the point at which the sealant is introduced.

7. A method as claimed in claim 1, in which during the introduction of the sealant, an upstream bore portion of the replacement pipe is temporarily sealed.

8. A method as claimed in claim 2, in which during the introduction of the sealant, an upstream bore portion of the replacement pipe is temporarily sealed.

9. A method as claimed in claim 1, in which during the introduction of the sealant the upstream bore of the replacement pipe is temporarily sealed.

10. A method as claimed in claim 1, in which the sealant is pumped along a tube to the point of introduction into the clearance, the tube being located within the replacement pipe.

11. A method as claimed in claim 2, in which the sealant is pumped along a tube to the point of introduction into the clearance, the tube being located within the replacement pipe.

* * * * *